(12) United States Patent
Weismuller et al.

(10) Patent No.: US 7,857,374 B2
(45) Date of Patent: Dec. 28, 2010

(54) CONVERTIBLE VEHICLE WITH A ROOF HELD AT LATERAL ROOF LINKAGE PARTS

(75) Inventors: Olaf Weismuller, Bramsche (DE); Klaus Russke, Bisendorf (DE)

(73) Assignee: Wilhelm Karmann GmbH, Munich (DE)

( * ) Notice: Subject to any disclaimer, the term of this patent is extended or adjusted under 35 U.S.C. 154(b) by 430 days.

(21) Appl. No.: 11/661,473

(22) PCT Filed: Jul. 28, 2005

(86) PCT No.: PCT/DE2005/001326

§ 371 (c)(1),
(2), (4) Date: Nov. 5, 2007

(87) PCT Pub. No.: WO2006/021177

PCT Pub. Date: Mar. 2, 2006

(65) Prior Publication Data

US 2008/0054673 A1 Mar. 6, 2008

(30) Foreign Application Priority Data

Aug. 27, 2004 (DE) .................. 10 2004 041 539

(51) Int. Cl.
*B60J 7/20* (2006.01)
(52) U.S. Cl. .................. 296/124; 296/107.08; 296/128; 296/132

(58) Field of Classification Search ................. 296/124, 296/125, 128, 132, 107.01, 107.08, 107.16, 296/136.01, 136.04, 136.05, 136.06
See application file for complete search history.

(56) References Cited

U.S. PATENT DOCUMENTS

| 5,197,778 A | 3/1993 | Burst |
| 5,868,454 A * | 2/1999 | Homann et al. ............. 296/128 |
| 5,921,608 A * | 7/1999 | Schmitt et al. ......... 296/107.08 |
| 5,967,593 A * | 10/1999 | Schuler et al. ......... 296/136.06 |
| 6,644,715 B1 * | 11/2003 | Bohnke ................. 296/107.08 |
| 6,682,124 B1 * | 1/2004 | Bohnke ................. 296/107.08 |
| 6,814,390 B2 * | 11/2004 | Habacker ............... 296/107.08 |
| 2006/0043759 A1 | 3/2006 | Habacker |

FOREIGN PATENT DOCUMENTS

| DE | 29921497 | 5/2000 |
| EP | 1288046 | 3/2003 |
| EP | 1449698 A1 | 8/2004 |

* cited by examiner

*Primary Examiner*—Patricia L Engle
(74) *Attorney, Agent, or Firm*—Gifford, Krass, Sprinkle, Anderson & Citkowski, P.C.

(57) ABSTRACT

The invention relates to a cabriolet vehicle having a roof which is provided with lateral roof linkage parts and can be stowed away in the rear of the vehicle. At least one hold-down device acts on the roof linkage parts of the stowed roof and is associated with the body of the vehicle.

21 Claims, 8 Drawing Sheets

CONVERTIBLE VEHICLE WITH A ROOF HELD AT LATERAL ROOF LINKAGE PARTS

REFERENCE TO RELATED APPLICATIONS

This application is the United States national phase of Patent Cooperation Treaty application No. PCT/DE05/001326, filed Jul. 28, 2005, which claims priority to German patent application No. DE 10 2004 041 539.0, filed Aug. 27, 2004, the entire content of both of which is incorporated herein by reference.

FIELD OF THE INVENTION

The invention relates to a convertible vehicle comprising a roof which can be stowed in the rear vehicle region. More particularly, the present invention relates to a hold down device for retaining the top in an open position.

BACKGROUND OF THE INVENTION

Convertible automotive vehicles include retractable roofs that are movable between a closed position covering a passenger compartment and an open position disposed in a storage space behind the passenger compartment. While driving with the roof in the open position, vibrations or bumps may cause parts of the roof to rub against each other resulting in premature wear.

To secure the stowed roof against such movements and also against an uncontrolled unfolding of the roof, it is known to provide hold-down devices for the positional securing of the roof stowed in the car body. For example, they can be associated with a top storage well cover which engages over the stowed roof. Such hold-down devices, however frequently press on the cover material, which again promotes wear. In addition, it is often desired as part of simplification and weight saving and optimization of the trunk volume to dispense with such a top storage well cover, in particular when the front region of the actual roof adjoining the windshield frame when the roof is closed remains unturned in the stowed state and substantially fills up the inlet opening.

It is the underlying problem of the invention to achieve a securing of the open roof which is as advantageous as possible in a generic convertible vehicle.

SUMMARY OF THE INVENTION

One or more hold down devices for the roof is or are formed by the configuration of a convertible vehicle in accordance with the invention independently of the presence of a top storage well cover. In addition, an abrading contact between the hold down device, on the one hand, and the roof cover or a painted surface of a fixed roof part, on the other hand, is prevented by the action on lateral roof linkage parts of the stowed roof. The contact surface of the hold down device at the roof linkage part must not be visible when the roof is closed.

A plurality of hold down devices can be realized per vehicle side without any great effort, which can effect a particularly good roof securing.

If each hold device includes a pressure body which can be pivoted open onto the roof linkage parts from above, the pressure body can be pivoted in through the inlet opening during the roof passage without restricting the inlet opening. The pressure nevertheless acts downwardly in the outwardly pivoted state and secures the roof against upward movements. The pressure body can advantageously be angled such that it engages around the roof linkage at least partially and therefore also secures the latter against lateral movement.

A particular saving in moving parts and thus also a weight saving results when, in a dual function, the linkage moves a trim part for the covering or releasing of a part of an inlet opening of the roof movable into the car body. No separate linkage is required for this.

The linkage can particularly favorably be held in flat contact at a rear wall bounding the passenger compartment such that it holds the trim part in a releasing position in a location beneath the plane of the inlet opening displaced at least partially with respect to its covering position in the direction of a vertical longitudinal central plane of the vehicle, set upright and extended transversely to the vehicle, with it being pivotable outwardly from this position into an intermediate position set upright. An optimization of the trunk is thus achieved with a simultaneously maximum available movement space for the roof.

Provided the trim parts have been pivoted inwardly in a releasing position from an intermediate position set upright, the trim parts can then be pivoted outwardly with the roof stowed without colliding with the roof peak, even if the roof peak reaches closely up to the trim parts initially still disposed in the released position. This permits a very favorable stowage position moved far to the front for the roof.

If, with the roof open, the front roof end is stowed in a constant orientation and if its side facing upwardly with a closed roof forms a visual termination surface for a substantial part of the middle region of the inlet opening, the roof end falls off toward its transverse sides with a customary vehicle design so that the use of trimming parts with the holding down devices in accordance with the invention can particularly be realized with good visual and mechanical aspects in these marginal regions.

BRIEF DESCRIPTION OF THE DRAWINGS

Further advantages and features of the invention result from an embodiment of the subject matter of the invention shown schematically in the drawings and described in the following descriptions.

DETAILED DESCRIPTION OF THE INVENTION

Referring to the figures, a convertible vehicle is indicated at 1 in accordance with the invention, which can be either a four-seater or a five-seater vehicle having a rear seat or a two-seater. The vehicle 1 includes a roof 2 that is movable between a closed position covering a passenger compartment and adjoining a windshield frame and an open position disposed in a storage space behind the passenger compartment. The roof 2 may be in the form of a retractable hard top or a soft top.

The roof 2 includes lateral roof linkage rails or parts 12, which extend longitudinally in a direction of travel F and along opposite sides of the vehicle 1. The lateral roof linkage parts 12 generally provide the connection between the roof 2 and main bearings arranged in the car body 4 and partly hold a plurality of roof parts to one another in the manner of lateral frame parts. The roof 2 can be stowed in the open position in a rear vehicle, for which purpose an inlet opening 3 into the car body 4 is provided which the roof 2 passes through completely or at least substantially during its stowing.

The roof 2 can be moved manually or fully automatically or semi-automatically.

In the present embodiment, the roof 2 can be stored in the car body 4 in a "Z fold" configuration, wherein the front roof end 5 connected to a windshield frame in the closed state maintains its orientation in the stowed state, with outer side 6 facing upward in both the stowed position and the closed state.

The transverse edges 7 of the front roof end 5 fall off due to the raised roof shape. When the middle region of the front roof end 5 is approximately disposed in the plane of the inlet opening 3, the transverse edges 7 therefore project further downwardly into the car body 4. With the roof 2 open, its upwardly facing side 6 can itself form a visual termination for a substantial part of the middle region of the inlet opening 3. A cover which engages over or similar can then be omitted here. Due to the falling off transverse edges 7, in contrast, a separate visual cover is advantageous outwardly, but not compulsory.

In the illustrated embodiment, a movable trim part 8 is shown at each side and is movably held by a linkage 9 extending transverse to the vehicle and parallel to a rear wall 11 bounding the rear of the passenger compartment. Depending on the course of this rear wall 11, transverse to the vehicle does not necessarily mean an angle of 90° to the longitudinal axis of the vehicle. The linkage 9 simultaneously serves the movement of one or more hold down devices 10, 10a which each act, with an open roof 2, via an elastically deformable pressure body 13, 13a acting as a buffer on lateral roof linkage parts 12 of the stowed roof 2. The pressure body or buffer 13, 13a is angled and its one limb 14, 14a engages around the roof linkage part 12 such that it is also secured against movement in the transverse direction of the vehicle. With a simultaneous forming of two hold down devices 10, 10a, which is only shown by way of example here, the limbs 14, 14 can be disposed opposite one another in the securing position to thus counteract a transverse movement of the stowed roof 2 to any side.

The linkage 9 for the hold down devices 10, 10a and the trim part 8 here includes a four-bar linkage 15, 16, 17, 18 for its inward and outward pivot movement transverse to the vehicle 1. A single-bar linkage is alternatively possible, in particular when a large vehicle width is available.

The pressure body 13 is arranged on the outer lever H1 of the four-bar linkage 15, 16, 17, 18 and is thereby pivotable open from above onto the roof linkage part or parts 12. In the embodiment, the same relationships are present at both vehicle sides; a one-side hold down device 10, 10a may also possibly be sufficient for securing the roof.

Since, in the outward displacement of the hold down device or devices 10, 10a, the linkage 9 displaces the latter with a component in the transverse direction of the vehicle, the lateral passage space is vice versa free for the roof linkage parts 12 with inwardly pivoted hold down devices 10, 10a. No adaptations therefore have to be made to the roof 2; the configuration in accordance with the invention can also be retrofitted on existing convertible vehicles.

For the movement of the hold down device 10, 10a, a separate actuator or (electric) drive 19 may be provided which, for example, acts on one of the levers H1, H2 via a pull-push bar 20.

To prevent an unintentional movement of the hold down device 10, 10a from its securing position, the outer lever H1 of the four-bar linkage 15, 16, 17, 18 can be held down by the inner lever H2 via a protruding arm or force communicator 21, whereby the four-bar linkage is also secured when the drive 19 is associated with the inner lever H2 of the four-bar linkage arranged more closely to the longitudinal central plane. The force communicator 21 can be made simply as a shaped part at the inner lever H2 which presses onto the outer lever H1 in the intermediate position or covering position. An upwardly directed force on the hold down device or devices 10, 10a can then be absorbed via the blocked drive 19. Additionally, a conical pin-type lock may be provided into which a co-moved axle stump 23 of a lever H1, H2 engages in the securing position.

The effort for the drive 19 and the linkage 9 is minimized here in that they also move and support the trim parts 8 in a dual function.

Figure 1:
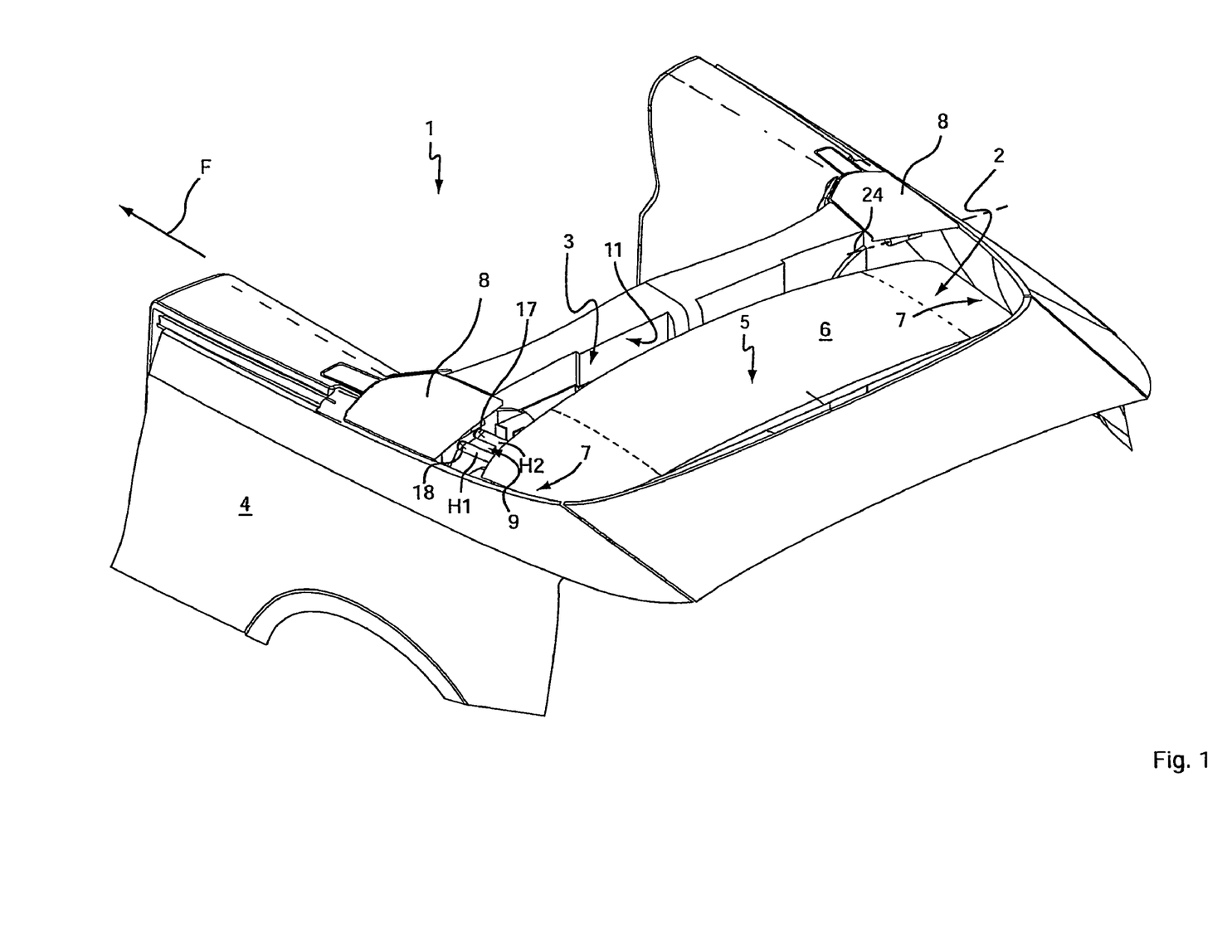
FIG. 1 is a schematic, perspective view of the rear vehicle region of a convertible vehicle in accordance with the invention broken off toward the vehicle front and rear with a roof stowed in the car body and with a trim part disposed in the covered position at each transverse side, with the pivot linkage for the trim part having two hold down devices for the roof linkage.
Figure 2:
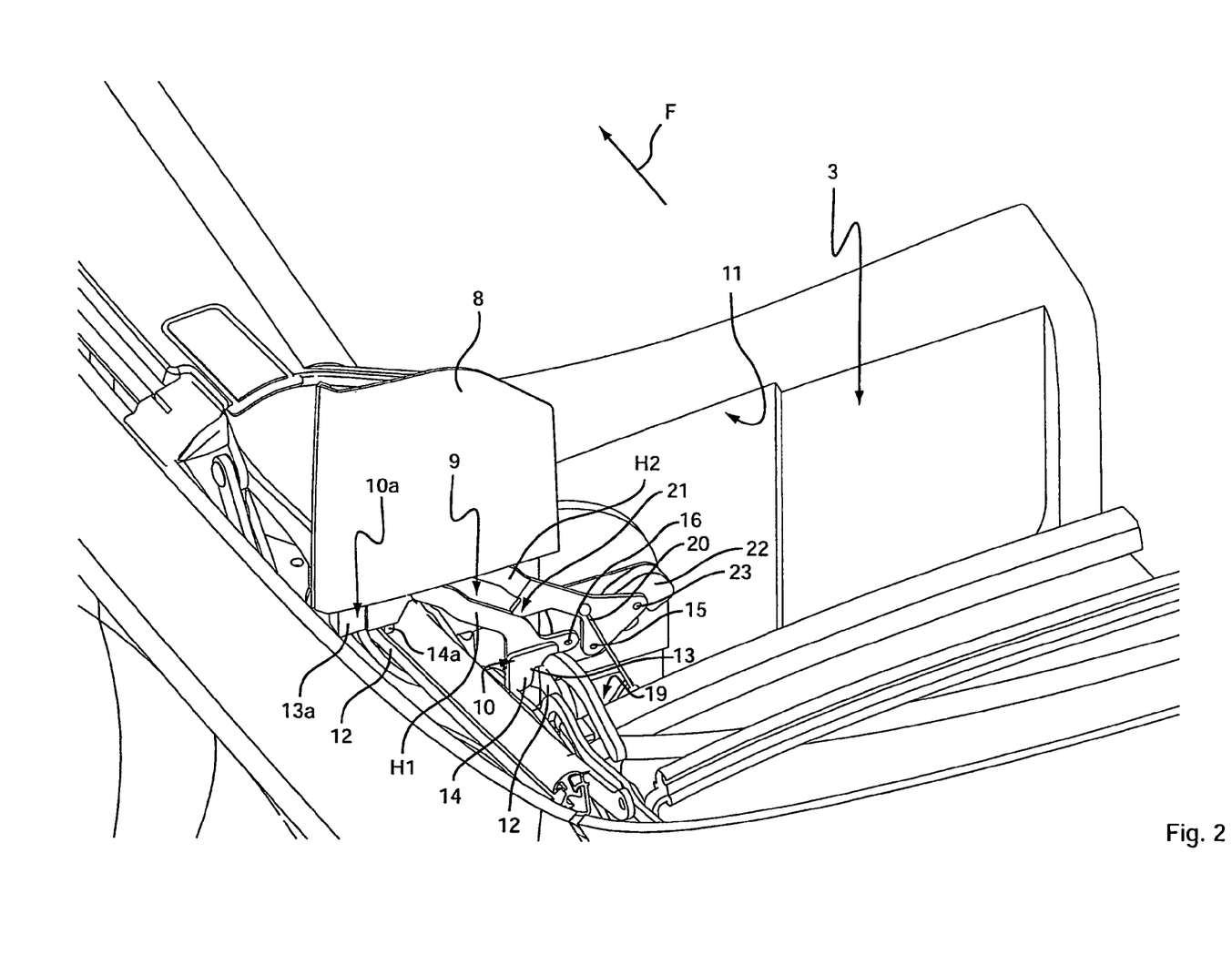
FIG. 2 is a section of the vehicle of FIG. 1 broken off at the vertical longitudinal central plane after pivoting of the trim part around a transverse vehicle axis into an intermediate position standing upright.

The trim part 8 can be pivoted upwardly out of the covering, substantially horizontal position in accordance with FIG. 1 around an axis 24 disposed transversely to the vehicle 1 into an intermediate position disposed upright (FIG. 2).

Figure 3:
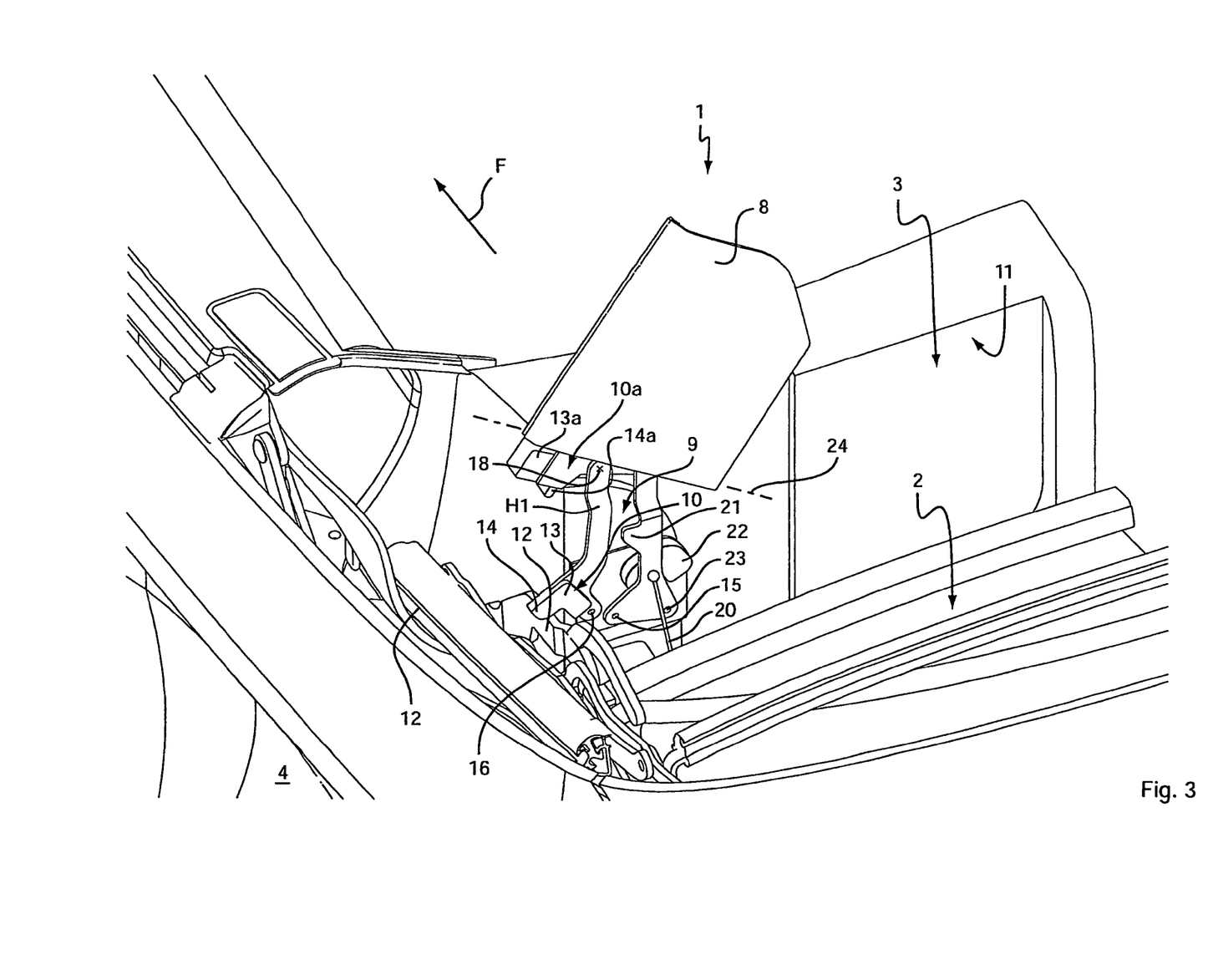
FIG. 3 is a similar view to FIG. 2 during the inward pivoting of the trim part from the intermediate position into the released position and simultaneous release of the hold down devices from the roof linkage.
Figure 4:
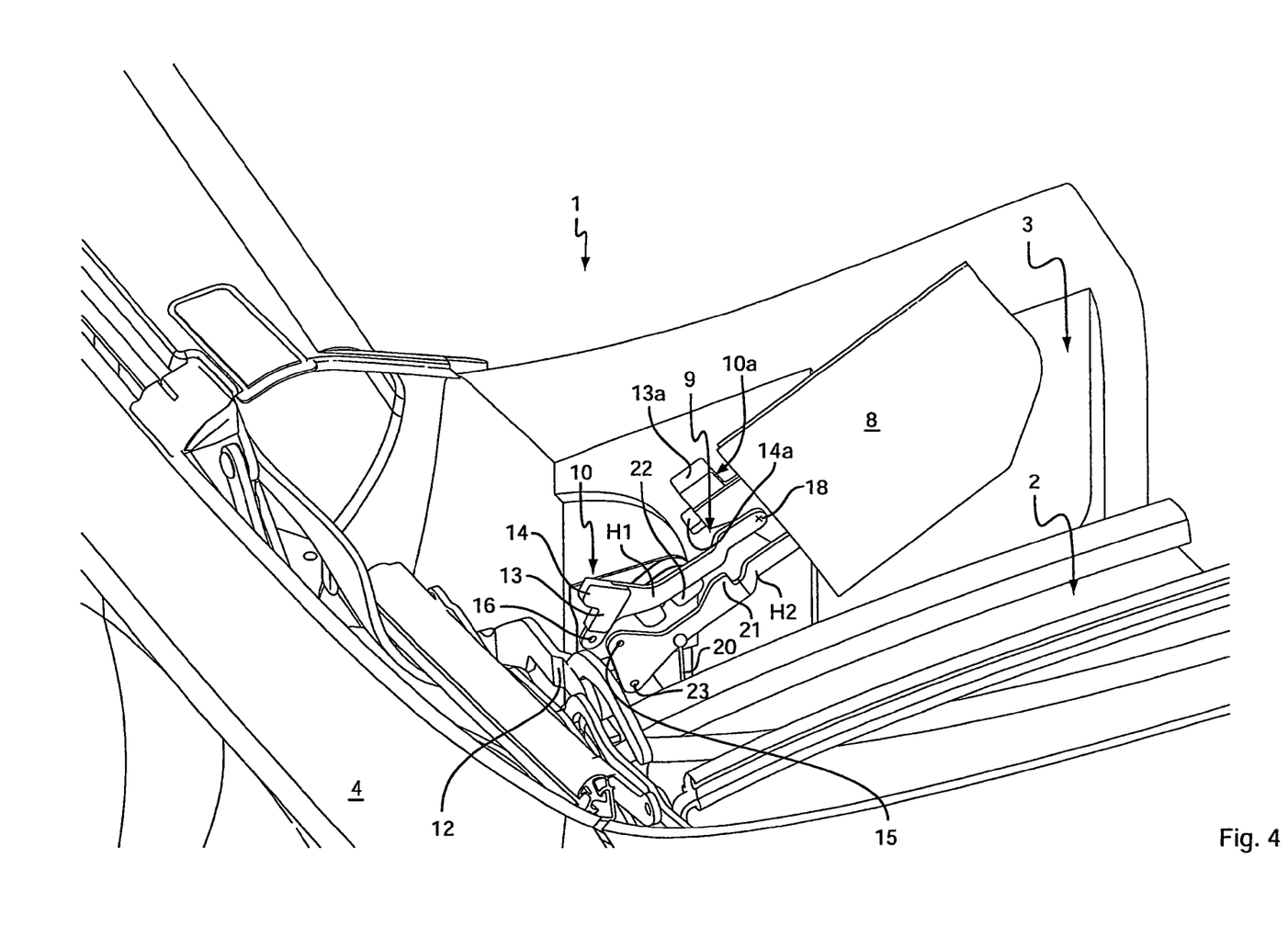
FIG. 4 is a similar view to FIG. 3 with a further progressing inward opening.
Figure 5:
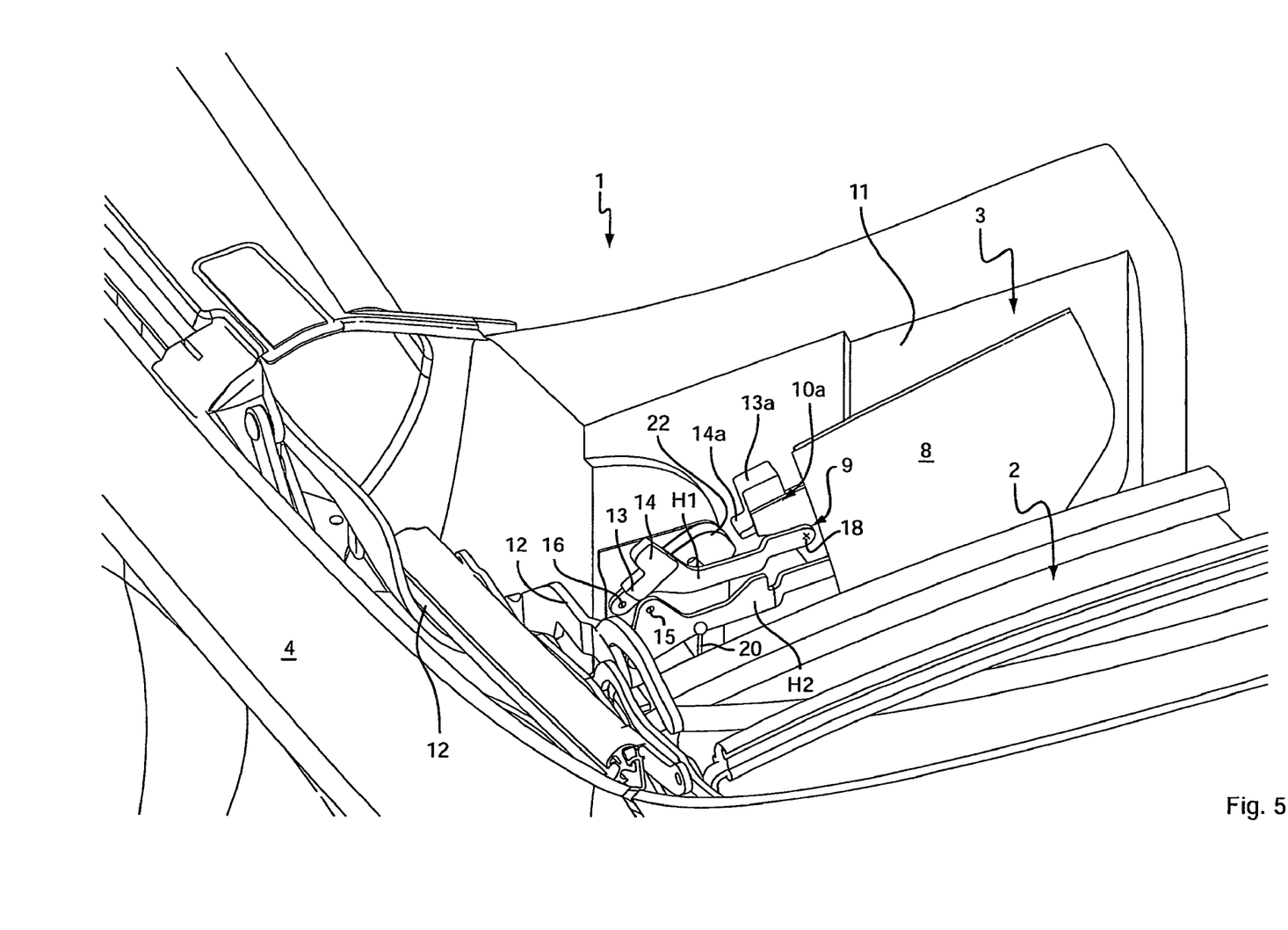
FIG. 5 is a similar view to FIG. 4 with a trim part pivoted almost into the released position and hold down devices displaced out of the orbit of movement of the roof linkage.
Figure 6:
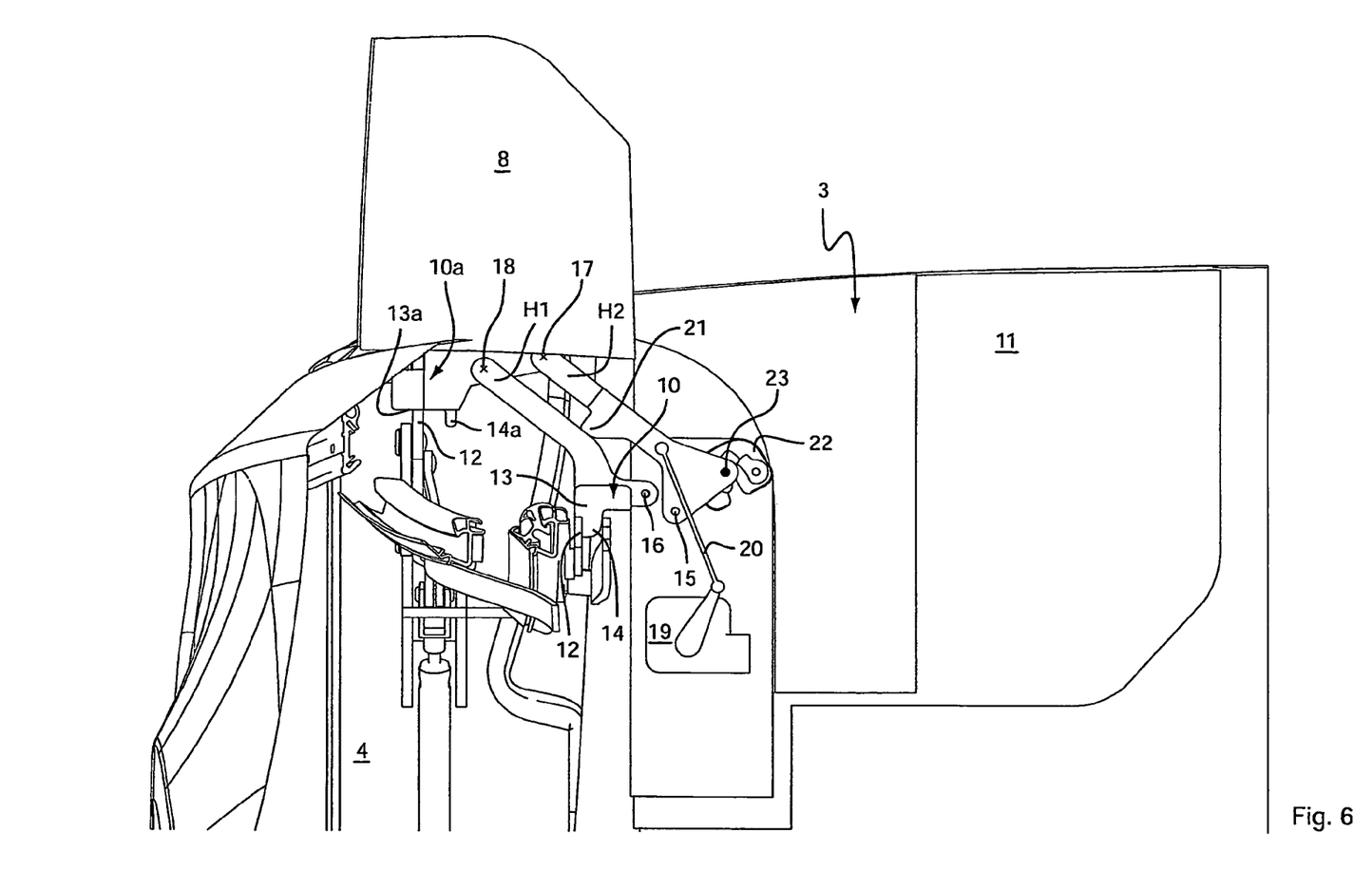
FIG. 6 is a view of the trim part and hold down devices from the rear in a position in accordance with FIG. 2 locked via a conical pin-type lock.
Figure 7:
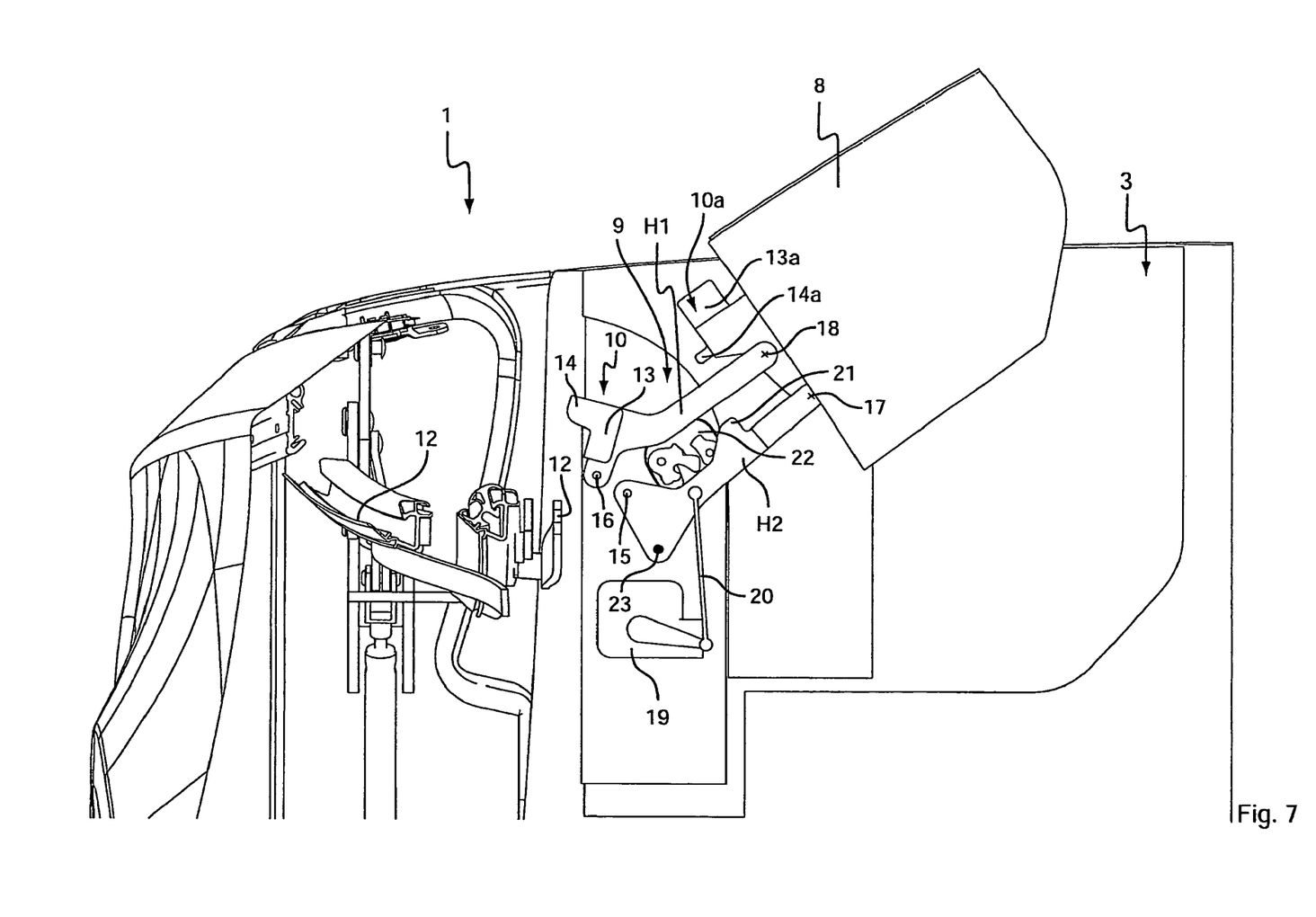
FIG. 7 is a similar view to FIG. 6 in the position of the hold down device in accordance with FIG. 4.
Figure 8:
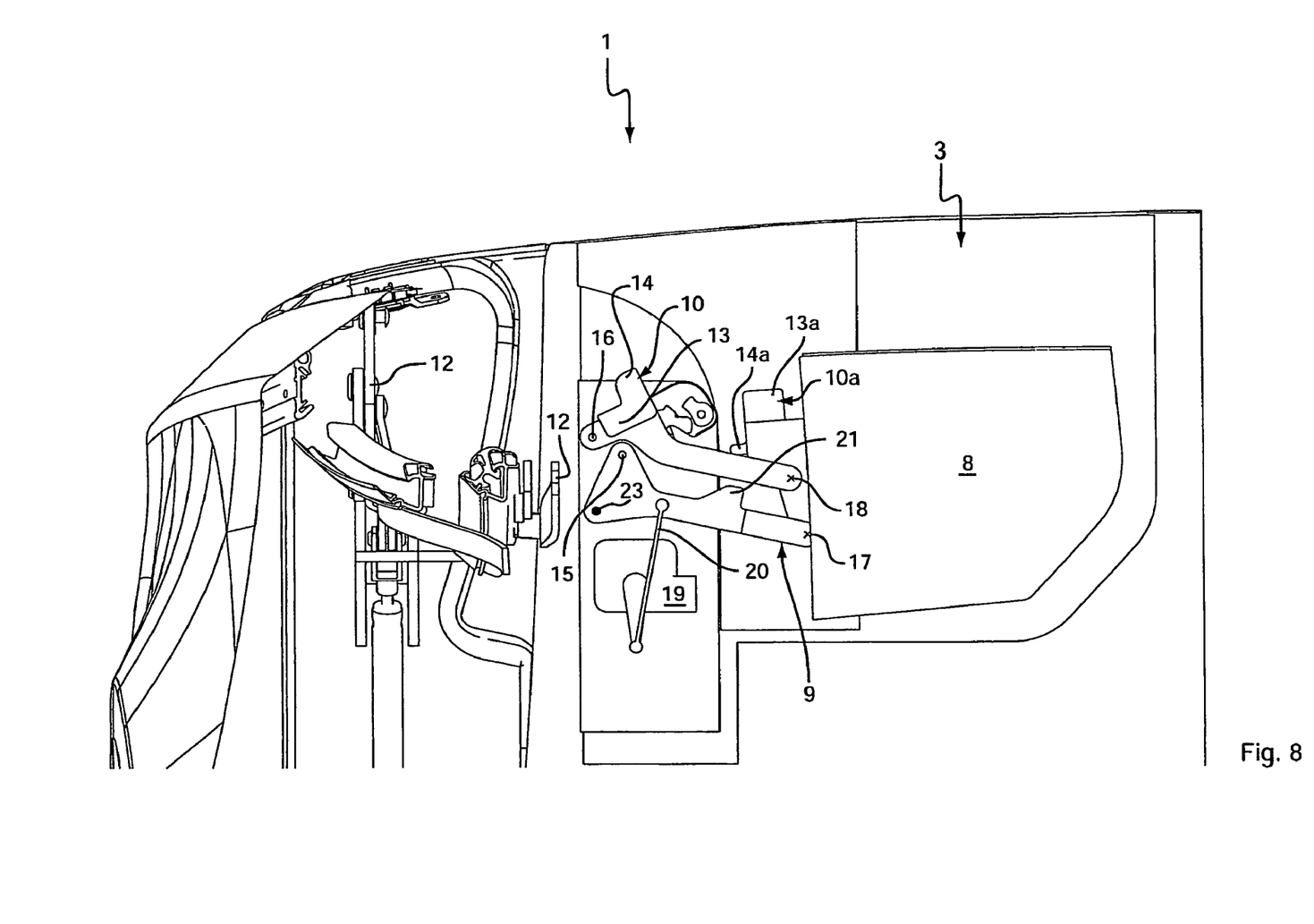
FIG. 8 is a similar view to FIG. 7 in a completely inwardly pivoted position of the hold down device similar to that of FIG. 5.

This intermediate position permits the following inward pivoting via the four-bar linkage 15, 16, 17, 18 also moving the hold down device 10, 10a (FIG. 3, FIG. 4) to reach the released position of the trim part 8 and of the hold down device 10, 10a shown in FIG. 5. A superimposed translatory and rotary movement is also possible in dependence on the orientation of the trim parts 8 in the released position (here facing toward the center).

The drive 19 can also effect the pivoting of the trim part 8 around the axis 24 via a corresponding force deflection; for this purpose, alternatively, a second drive or a compulsory movement with spring force assistance can also be provided. The pivot axis 24 is advantageously pivotable inwardly and outwardly together with the trim part 8, just like the hold down device 10, 10a is moved along in a compulsory manner with this transverse displacement.

The hold down device 10, 10a secures the lateral roof linkage parts 12 both in the intermediate position and in the covering position of the trim part 8 and is thus independent of the further pivoting around the axis 24.

Contrary to what is shown in the embodiments, the trim parts 8 can also pivot from the intermediate position to the rear and then cover a region disposed further to the rear. The hold down device 10, 10a does not have to be changed for this.

The invention has been described in an illustrative manner. It is, therefore, to be understood that the terminology used is intended to be in the nature of the words of description rather than of limitation. Many modifications and variations of the invention are possible in light of the above teachings. Thus, within the scope of the appended claims, the invention may be practiced other than as specifically described.

We claim:

1. A convertible vehicle, comprising:
a vehicle body;
a roof having lateral roof linkage parts, the roof being stowable in a rear vehicle region; and
at least one hold down device associated with the vehicle body, the hold down device engaging and applying a downward pressure to the lateral roof linkage parts of the stowed roof when the hold down device is in a securing position.

2. A convertible vehicle in accordance with claim 1, wherein the at least one hold down device is two hold down devices provided at one vehicle side.

3. A convertible vehicle in accordance with claim 1, wherein the hold down device includes a pressure body and is pivotable open from above with respect to the lateral roof linkage parts.

4. A convertible vehicle in accordance with claim 1, wherein the hold down device is supported by a linkage, the linkage displacing the hold down device outwardly with a component in the transverse direction of the vehicle to move the hold down device to a securing position.

5. A convertible vehicle in accordance with claim 4, wherein the linkage includes a four-bar linkage.

6. A convertible vehicle in accordance with claim 4, further comprising a lock, the lock operable to hold the linkage in the outwardly displaced position.

7. A convertible vehicle in accordance with claim 4, further comprising a trim part for the covering or releasing of a part of an inlet opening of the roof, the linkage further supporting the trim part for movement between a covering and a releasing position.

8. A convertible vehicle in accordance with claim 7, wherein the trim part is supported by the linkage at a rear wall bounding a passenger compartment of the vehicle such that it is held in the releasing position in a location beneath the plane of the inlet opening and is displaced at least partially with respect to its covering position in the direction of a vertical longitudinal central plane of the vehicle, the trim part in the releasing position being disposed upright and extending transversely to the vehicle, the trim part being pivotable outwardly from the releasing position into an intermediate position wherein the trim part is disposed upright.

9. A convertible vehicle in accordance with claim 8, wherein the trim part is pivotable between the covering position and the intermediate position around an axis disposed transversely to the vehicle.

10. A convertible vehicle in accordance with claim 1, wherein the roof has a front roof end that is connected to a windshield frame when the roof is closed, the front roof end having an outer side that is facing upwardly when the roof is closed and when the roof is stowed, the outer side forming a visual termination surface for a substantial part of a middle region of an inlet opening for the roof when the roof is stowed.

11. A convertible vehicle comprising:
a vehicle body;
a retractable roof having lateral roof linkage parts that allows movement of the roof between a closed position extending in a generally fore and aft direction over a passenger compartment in the vehicle and an open position disposed in a storage space behind the passenger compartment;
a trim part movably coupled to the vehicle for movement between a covering position for covering at least a portion of the roof in the open position and a releasing position disposed inwardly relative to the covering position; and
a hold down device coupled to the trim part for movement therewith between the covering position and the releasing position, the hold down device contacting and applying a downward pressure to the roof linkage parts when the trim part is in the covering position to retain the roof in the open position.

12. A convertible vehicle as set forth in claim 11, further including a linkage that pivotally couples the trim part to the vehicle for movement between the covering position and the releasing position, the hold down device being interconnected to the linkage for movement therewith such that the hold down device contacts the roof linkage parts when the trim part is in the covering position to retain the roof in the open position.

13. A convertible vehicle as set forth in claim 12, wherein the linkage includes a pair of levers defining a four-bar linkage mechanism, the hold down device being interconnected with one of the pair of levers.

14. A convertible vehicle as set forth in claim 13, wherein an inner lever of the pair of levers includes a protruding arm that engages the outer lever to secure the trim part in the covering position.

15. A convertible vehicle as set forth in claim 14, further including an actuator operatively coupled to the inner lever for driving the trim part between the covering position and the releasing position.

16. A convertible vehicle as set forth in claim 11, wherein the hold down device includes an elastically deformable pressure body that contacts the roof linkage parts when the trim part is in the covering position to retain the roof in the open position.

17. A convertible vehicle as set forth in claim 16, wherein the pressure body is angled and includes a limb that contacts the roof when the trim part is in the covering position to substantially constrain transverse movement of the roof linkage parts in the vehicle.

18. A convertible vehicle as set forth in claim 16, wherein the pressure body is fixedly secured to an outer lever of the pair of levers for movement therewith between the covering position and the stowed position.

19. A convertible vehicle as set forth in claim 11, wherein the lateral roof linkage parts form a Z-shape in the open position.

20. A convertible vehicle as set forth in claim 11, wherein the roof includes a front roof end with an outer side that faces upwardly in both the closed and open positions of the roof.

21. A convertible vehicle comprising:
a retractable roof having lateral roof linkage parts that allow movement of the roof between a closed position extending in a generally fore and aft direction over a passenger compartment in the vehicle and an open position disposed in a storage space behind a passenger compartment; and
a hold down device coupled to the vehicle body and movable between an securing position and a released position, the hold down device engaging and applying a downward pressure to the lateral roof linkage parts when the hold down device is in the securing position to retain the roof in the open position.

* * * * *

UNITED STATES PATENT AND TRADEMARK OFFICE
CERTIFICATE OF CORRECTION

Page 1 of 1

PATENT NO.        : 7,857,374 B2
APPLICATION NO.   : 11/661473
DATED             : December 28, 2010
INVENTOR(S)       : Olaf Weismuller and Klaus Russke It is certified that error appears in the above-identified patent and that said Letters Patent is hereby corrected as shown below:

Column 4, line 33, replace "lock may" with --lock 22 may--

Signed and Sealed this
Nineteenth Day of July, 2011

David J. Kappos
*Director of the United States Patent and Trademark Office*